United States Patent

Scherrer

[11] Patent Number: 6,066,910
[45] Date of Patent: May 23, 2000

[54] COMMUTATOR-LESS DIRECT-CURRENT MOTOR

[75] Inventor: Ernst Scherrer, Greifensee, Switzerland

[73] Assignee: Micronel AG, Switzerland

[21] Appl. No.: 09/281,244

[22] Filed: Mar. 30, 1999

[30] Foreign Application Priority Data

Mar. 31, 1998 [CH] Switzerland .............................. 0777/98

[51] Int. Cl.⁷ .......................... H02K 21/14; H02K 29/02
[52] U.S. Cl. .................................. 310/268; 310/40 MM; 310/203; 310/208; 310/156
[58] Field of Search ............................. 310/49, 179, 180, 310/203, 208, 254, 268, 40 MM, 156, DIG. 6; 29/596, 597, 598

[56] References Cited

U.S. PATENT DOCUMENTS 3,891,905  6/1975  Muller ...................................... 318/254
4,728,833  3/1988  Shiraki et al. ......................... 310/68 R
4,733,119  3/1988  Shiraki et al. ............................ 310/268
4,859,890  8/1989  Sedgewick ................................ 310/208
5,514,923  5/1996  Gossler et al. ............................. 310/74

FOREIGN PATENT DOCUMENTS 0221459  5/1987  European Pat. Off. ....... H02K 29/08
2260069  6/1974  Germany ....................... H02K 29/02
54-57601  5/1979  Japan .

*Primary Examiner*—Nestor Ramirez
*Assistant Examiner*—Tran N Nguyen
*Attorney, Agent, or Firm*—Webb Ziesenheim Logsdon Orkin & Hanson, P.C.

[57] ABSTRACT

A direct-current motor has a single coil having a plurality of active branches and a rotor having a permanent magnet. The active branches are arranged in sequence essentially without gaps. The permanent magnet has magnetic segments which overlap all the active branches. The number of magnetic poles is at least equal to the number of active branches. As a result of the magnetic overlap of the coil and the permanent magnet, a greater efficiency is achieved.

9 Claims, 5 Drawing Sheets

COMMUTATOR-LESS DIRECT-CURRENT MOTOR

BACKGROUND OF THE INVENTION

1) Field of the Invention

This invention relates to a commutator-less direct-current motor, the stator of which has a single coil with a plurality of active branches and means to control the current in the coil depending on the winding position of the rotor, and the rotor of which is provided with a permanent magnet.

2) Description of the Prior Art

Motors with electronic commutation are generally known and are used in particular as economical drives for axial and radial fans. As a rule, one or more Hall-effect elements are used to detect the position of the rotor, of the detection uses the back-EMF principle.

Commutator-less direct-current motors of this type are disclosed, for example, in DE-A-2 260 069. In this publication, the embodiment illustrated in FIGS. 1 to 4 shows a commutator-less direct-current motor that has a plurality of discrete coils. In the realization illustrated in FIG. 8 there is only one single coil, which has four active branches 103 to 106 and two essentially inactive coil ends. In this case, the coil has approximately the shape of a drawn-out rectangle. The two coil ends in this case are formed by the facing narrow sides of this rectangle.

EP-A-0 221 459 discloses a small fan with a commutator-less direct-current motor that also has a single coil. In this case, too, the coil of the stator is in the shape of a drawn-out rectangle. The narrow sides of the coil form essentially inactive areas.

The object of the invention is to create a commutator-less direct-current motor of the type described above that has an essentially greater efficiency and can nevertheless be manufactured economically. The direct current motor is suitable in particular for use in a small fan.

SUMMARY OF THE INVENTION

This object is achieved by a direct-current motor of the type described above in which the active branches are located one behind the other with essentially no gap, the permanent magnet with its magnet segments overlaps all the active branches, and the number of the magnetic poles is at least equal to the number of the active branches.

On the direct-current motor as claimed by the invention, the magnetic overlap of the coil on the permanent magnet is significantly greater than in the prior art, and essentially the entire coil is active. Inactive coil end areas are reduced to a negligible segment. The desired significant increase in efficiency is achieved as a result of the greater overlap of all the magnetic segments and the reduction of the coil ends. Compared to direct-current motors that have a plurality of discrete coils, the manufacture of the direct-current motor claimed by the invention is significantly more economical, because only one single coil is required. When the coil is oriented axially, it also becomes possible to manufacture a particularly flat motor. The teaching of the invention also makes it possible to manufacture coils with a cylindrical or conical winding.

BRIEF DESCRIPTION OF THE DRAWINGS

Embodiments of the invention are described in greater detail below and are illustrated in the accompanying drawings, in which.

DETAILED DESCRIPTION OF THE PREFERRED EMBODIMENTS

Figure 1:
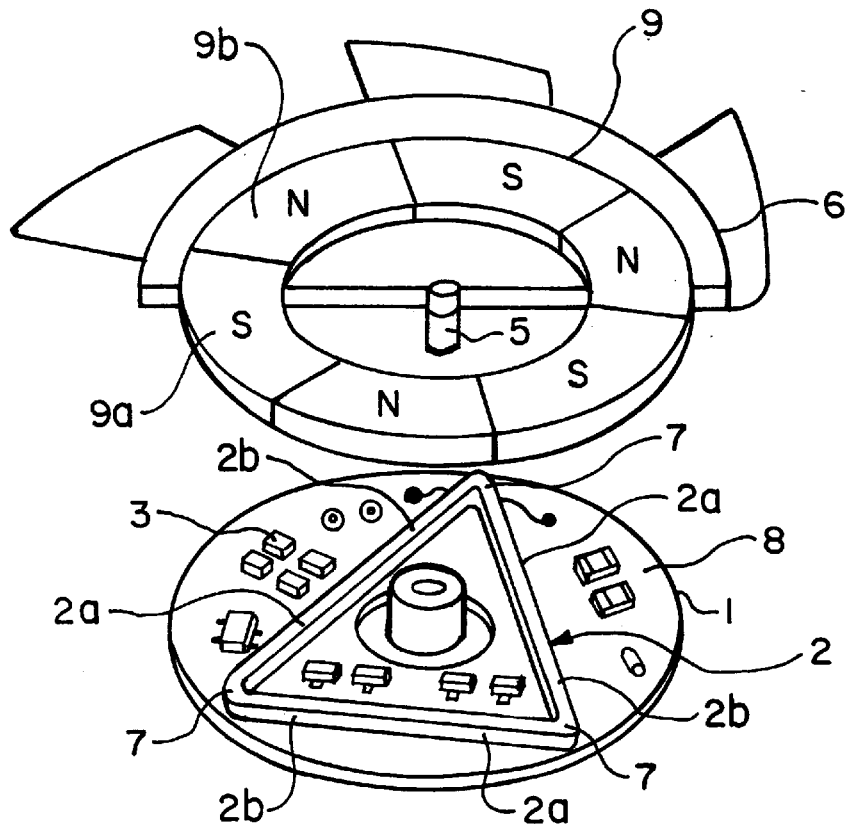
FIG. 1 is a schematic illustration of a direct-current motor as claimed by the invention, whereby the stator and the rotor are pulled apart for purposes of illustration.

FIG. 1 shows a stator 1 that has a flat circular stator plate 8 which is made of an electrically insulating material. Fastened to the stator plate 8 is a single, coreless flat coil 2 which acts as the motor winding. In the center of the stator plate 8 there is a bearing 16 in which a shaft 5 of the rotor 6 is rotationally mounted. The bearing 16 is realized so that the rotor 6 is held at a precisely specified distance from the stator 1. The conventional circuit elements 3 are located on the stator plate 8.

Figure 9:
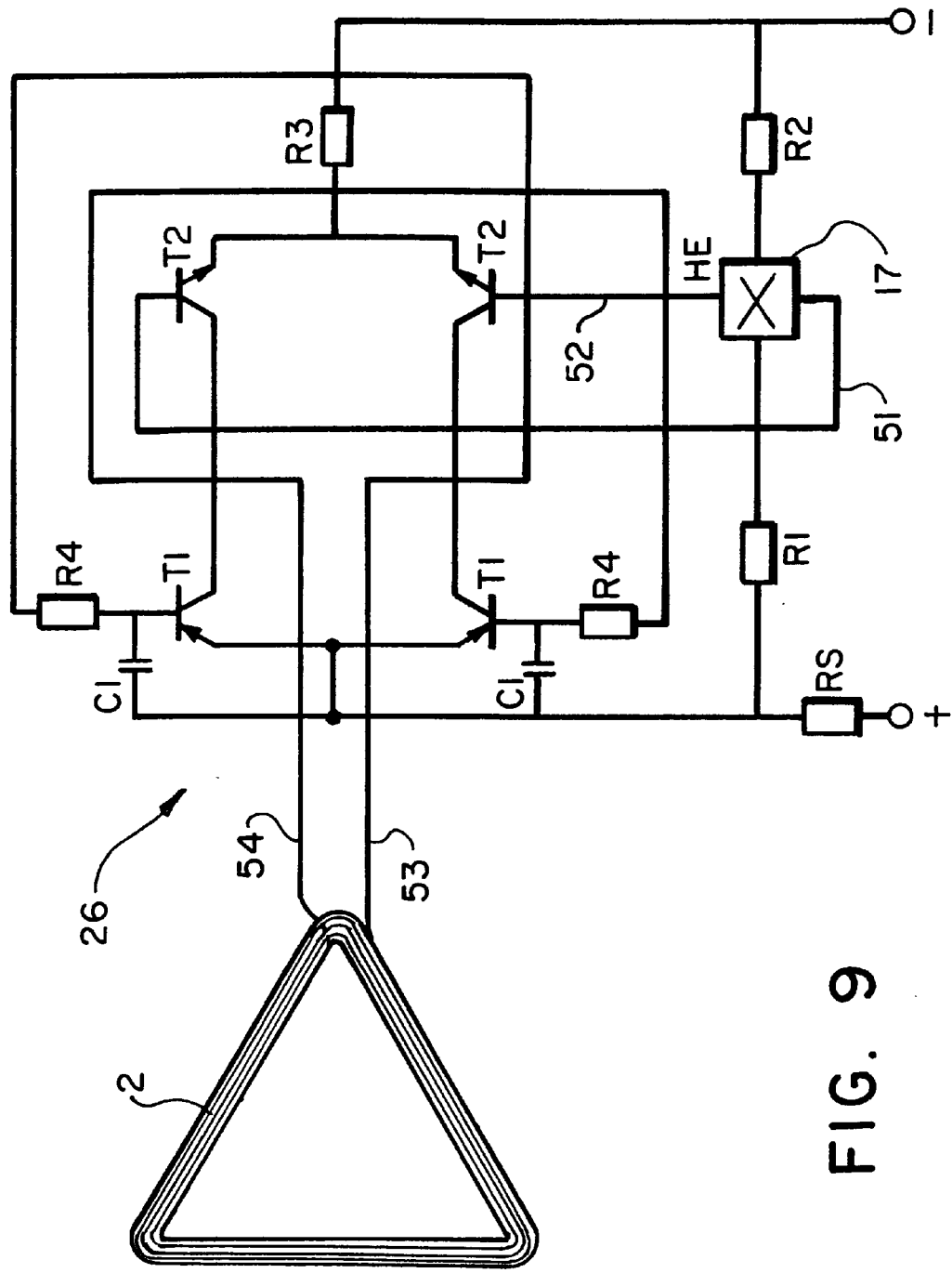
FIG. 9 is a circuit diagram of a motor as claimed by the invention.

FIG. 9 shows a suitable circuit 26. This circuit has a Hall-effect element 17 that defines the starting position of the rotor 6. The coil 2 is wound, although it can also be manufactured in the manner of the prior art using etching technology. The Hall-effect element 17 is positioned in the magnetically active area of the rotor 6, and has two control outputs 51 and 52. A transistor circuit 2×T1 and 2×T2 effects a reversal of the current direction on the coil 2. In a first rotor position, the Hall-effect element 17 is overlapped by a "north" magnetic pole. The control output 51 actuates the coil so that the current direction in the coil 2 runs in the clockwise direction. In a second rotor position, the Hall-effect element 17 is overlapped with a "south" oriented magnetic pole. The control output 52 controls the coil 2 so that the current direction in the coil 2 runs in the counter-clockwise direction. On a six-pole magnet, the sequences described above occur three times each per revolution of the rotor 6.

Figure 2:
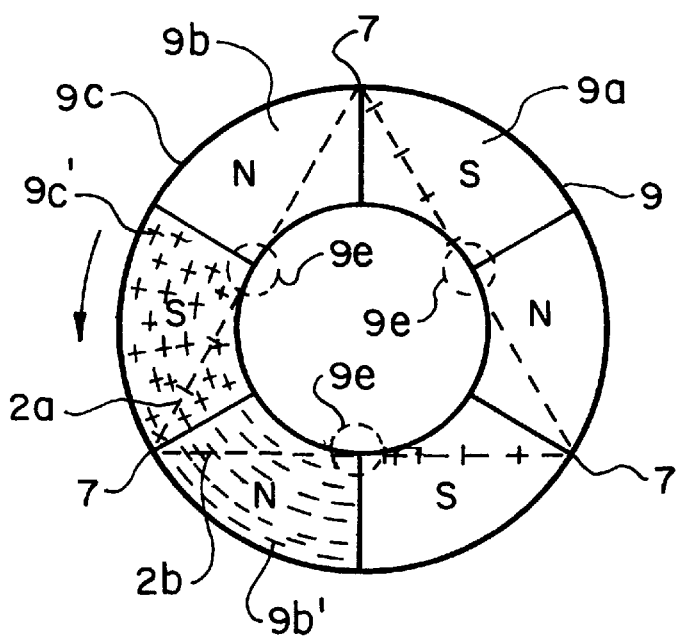
FIG. 2 is a schematic illustration of the location of the coil relative to the permanent magnet.
Figure 3:
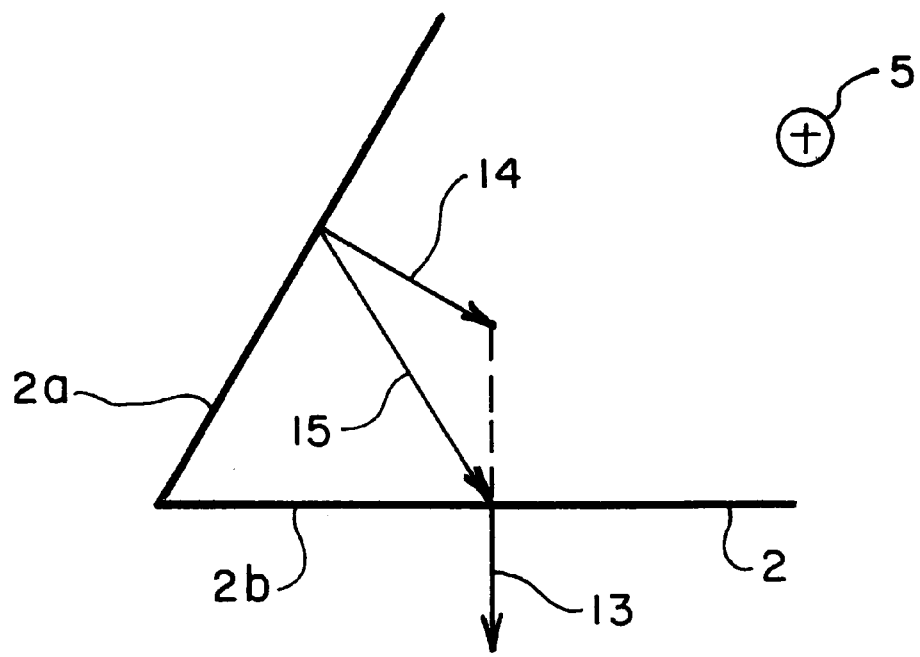
FIG. 3 is a schematic illustration of the action of the coil on the permanent magnet.
Figure 4:
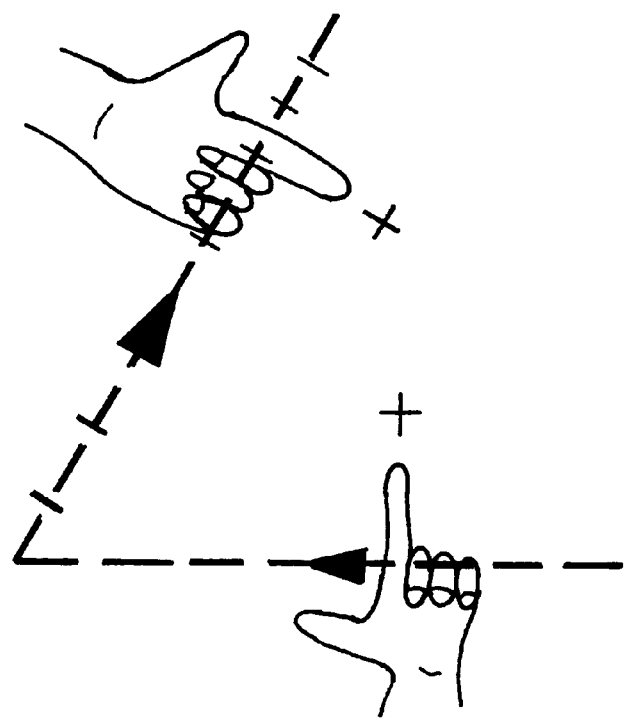
FIG. 4 is a schematic illustration of the function of the coil.

The permanent magnet 9, as shown in FIG. 1, is a ring-shaped disc and has three south poles 9a and three north poles 9b. As FIG. 2 shows, these poles 9a and 9b form equal segments of the permanent magnet 9. Fastened to the permanent magnet 9 is a part 18 that is, for example, the blade wheel of a fan. The shaft 5 is in turn fastened to this part 18. The rotor 6 consists in this case of the permanent magnet 9, the blade wheel 18 and the shaft 5. The rotor 6, however, can also be realized in other ways.

The coil 2 forms an equilateral triangle and has three coil ends 7 as well as three active branches 2a and 2b. As shown in FIG. 2, the active branches 2a and 2b overlap the segments of the poles 9a and 9b. The three coil ends 7 are located as shown on the outermost edge 9c of the permanent magnet 9. The centers of the sides of the coil 2 each form a separation 9e between neighboring branches 2a and 2b. These separations 9e form transitions between neighboring branches 2a and 2b and are located on the inner edge 9d of the permanent magnet 9. The invention teaches that it is essential that these active branches 2a and 2b are in a sequence essentially without gaps, and the coil 2 has essentially no inactive areas. The coil ends 7 form comparatively sharp corners and the inactive area at this point is negligible compared to the length of the active branches 2a and 2b.

The active branches 2a and 2b exert a force along the vector 15 on the permanent magnet 9 to create a torque. This vector 15 is the resultant force of the two force vectors 13 and 14, each of which runs at a right angle to the active branch 2a and 2b respectively. Two active branches 2a and 2b next to a coil end 7 thus exert forces along the vectors 13 and 14 that are added to the resultant force along the vector 15. As also shown in FIG. 2, the neighboring active branches 2a and 2b on one side of the coil 2 each change from one pole field to the other. As FIG. 2 clearly shows, essentially the entire coil 2 is active. The magnetic overlap of the coil 2 is also essentially complete.

The number of active areas 2a and 2b equals the number of poles 9a and 9b. The number of magnetic poles 2a and 2b is equal to at least the number of active branches 2a and 2b.

Figure 5A:
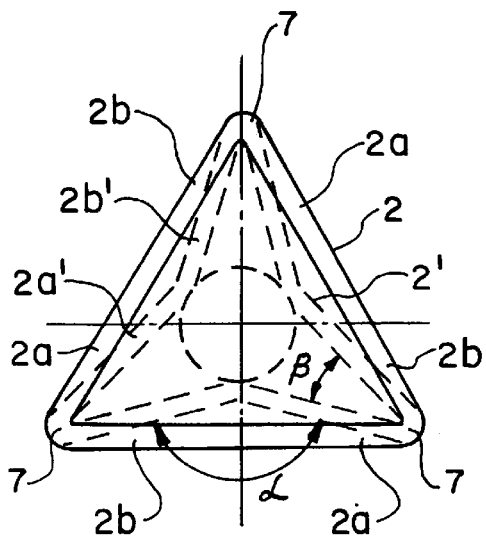
FIGS. 5a and 5b are schematic illustrations of a variant realization of the coil and of the permanent magnet.
Figure 5B:
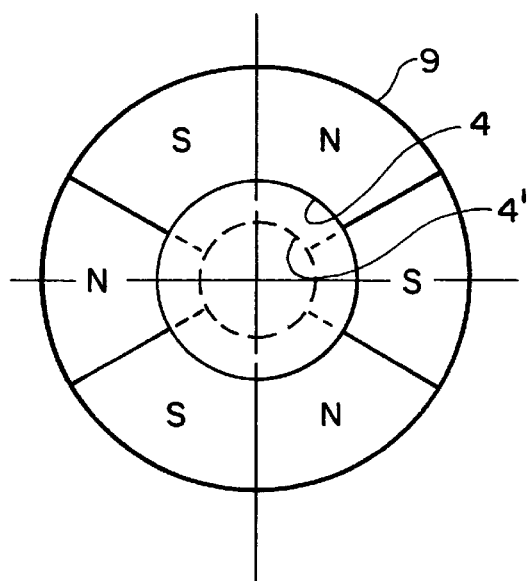

FIG. 5a shows in broken lines a coil 2' on which the neighboring active areas 2a' and 2b' of each side run at an angle to one another and enclose an oblique angle α. As a result of this arrangement of the active branches 2a' and 2b', the efficiency can be increased even further. FIG. 5b shows the permanent magnet 9' which has a recess 4' which is correspondingly smaller than the recess 4. On the coil ends 7, neighboring branches 2a' and 2b' form an acute angle β which is significantly smaller than 60 °.

Figure 6A:
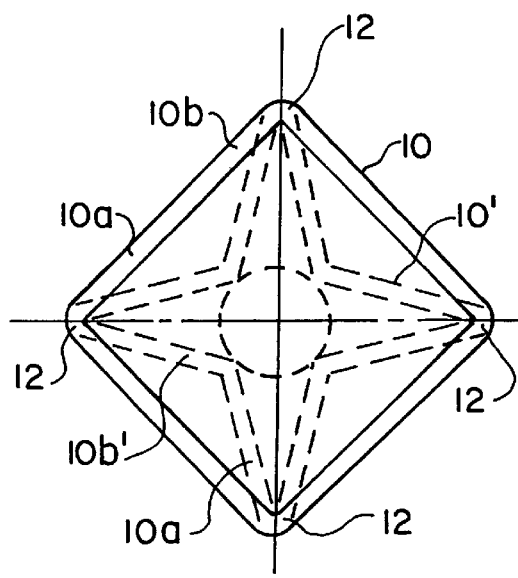
FIGS. 6a and 6b illustrate an additional variant of the coil and of the permanent magnet.
Figure 6B:
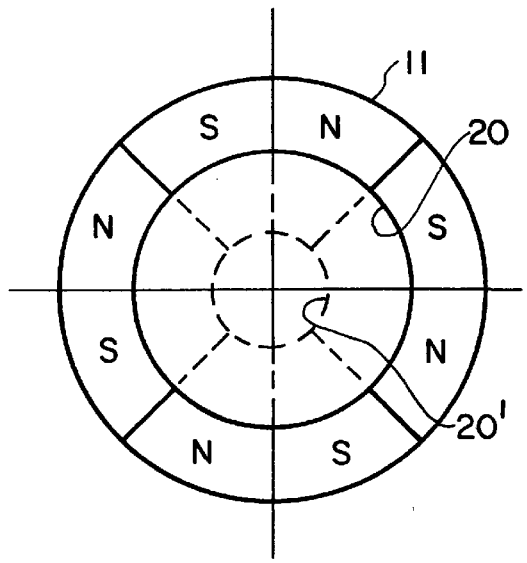

FIG. 6a shows a coil 10 with four coil ends 12 and eight active branches 10a and 10b. Accordingly, the permanent magnet 11 illustrated in FIG. 6b has four north poles and four south poles. The recess 20 is adapted to the coil 10 so that all the active branches 10a and 10b are magnetically overlapped. On the coil 10' illustrated in broken lines, the neighboring active branches 10a' and 10b' are oriented at an angle to one another, similar to the embodiment illustrated in FIG. 5a. In this case, accordingly, there is a recess 20' drawn in broken lines, which has a smaller radius than the recess 20. The coil 10' has an even smaller percentage of inactive areas than the coil 10, and a greater efficiency.

Figure 8:
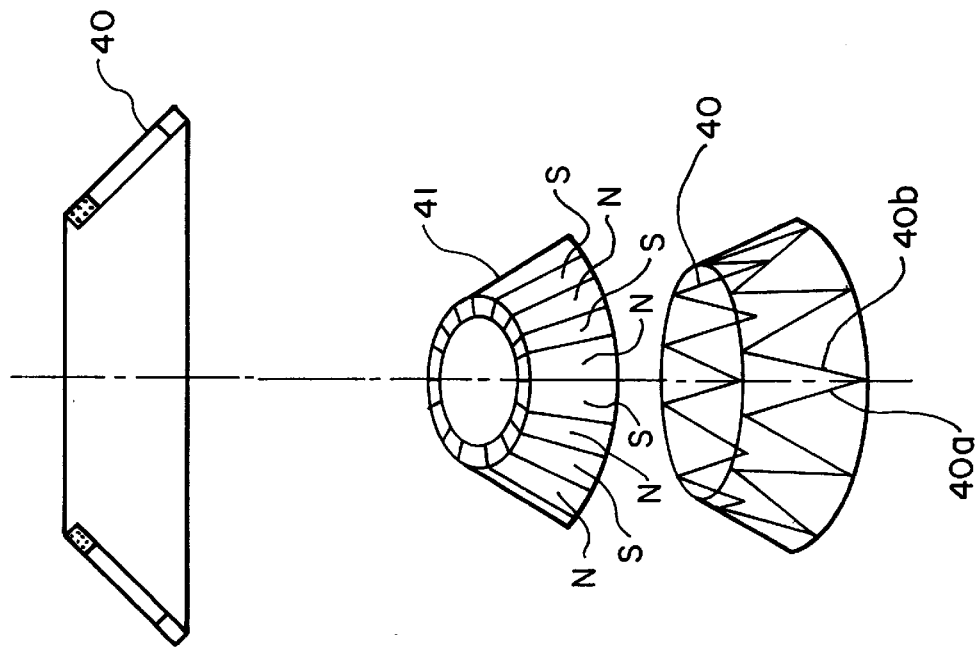
FIGS. 7 and 8 illustrate additional variants of the coil.
Figure 7:
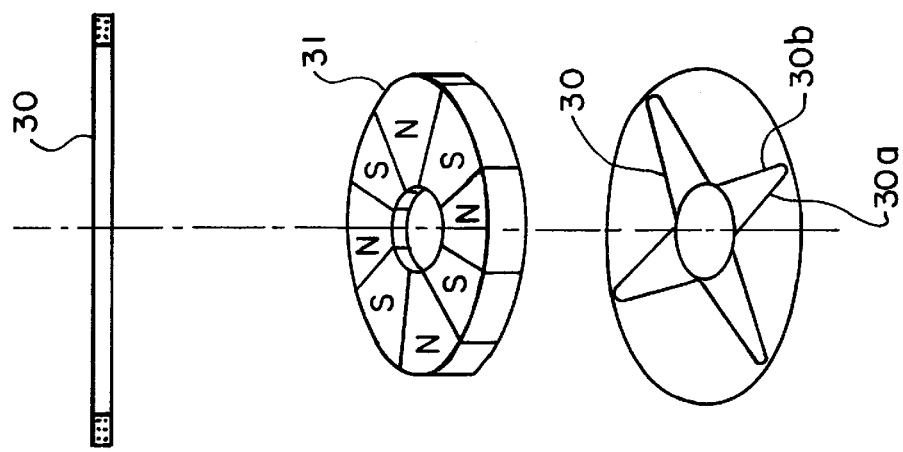

FIGS. 7 and 8 show two additional coils 30 and 40 which have an even higher number of active branches 30a and 30b and 40a and 40b respectively. In the embodiment illustrated in FIG. 7, the coil 30 is located in a plane. In the embodiment illustrated in FIG. 8, the coil 40 is realized in a conical shape. The flat coil 30 interacts with a flat magnet 31 and the conical coil 40 with a correspondingly conical magnet 41.

I claim:

1. A commutator-less direct-current motor comprising a stator having a coil with a plurality of active branches and a rotor having a permanent magnet, wherein:

the active branches are arranged one after another essentially without gaps;

the permanent magnet has magnetic segments that overlap all the active branches; and the permanent magnetic has a plurality of magnetic poles, with the number of magnetic poles at least equal to the number of active branches.

2. The motor as claimed in claim 1, wherein the coil forms a polygon.

3. The motor as claimed in claim 2, wherein each side of the polygon is formed from two active branches.

4. The motor as claimed in claim 3, wherein the active branches of each side run at an angle to one another.

5. The motor as claimed in claim 1, wherein the coil forms one of a triangle and a rectangle.

6. The motor as claimed in claim 1, wherein the number of active branches is equal to the number of poles of the permanent magnet.

7. The motor as claimed in claim 1, wherein the coil is a flat coil.

8. The motor as claimed in claim 1, wherein the coil ends are acute-angle corners between two neighboring active branches and the coil ends are reduced to an essentially negligible length.

9. The motor as claimed in claim 8, wherein the coil has a conical shape.

* * * * *

UNITED STATES PATENT AND TRADEMARK OFFICE
CERTIFICATE OF CORRECTION

PATENT NO. : 6,066,910
DATED : May 23, 2000
INVENTOR(S) : Ernst SCHERRER

It is certified that error appears in the above-identified patent and that said Letters Patent is hereby corrected as shown below:

Column 1 Line 16 "of" (second occurrence) should read --if--.

Column 3 Line 1 "2*b*are" should read --2*b* are--.

Claim 1 Line 18 Column 4 "magnetic" should read --magnet--.

Signed and Sealed this

Twenty-fourth Day of April, 2001

*Attest:*

NICHOLAS P. GODICI

*Attesting Officer*  Acting Director of the United States Patent and Trademark Office